Feb. 22, 1955      B. VONNEGUT      2,702,471
MEANS FOR MEASURING INDIVIDUAL AEROSOL PARTICLES
Filed March 27, 1951      2 Sheets-Sheet 1
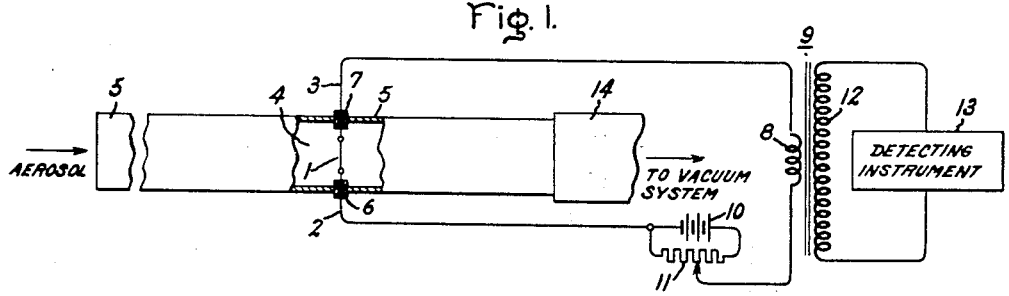
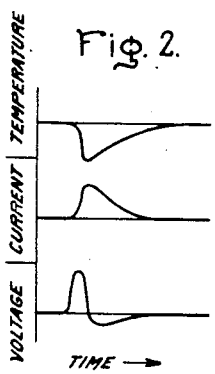 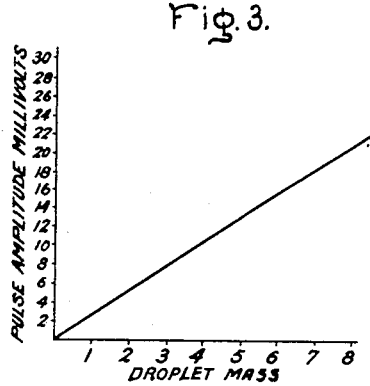 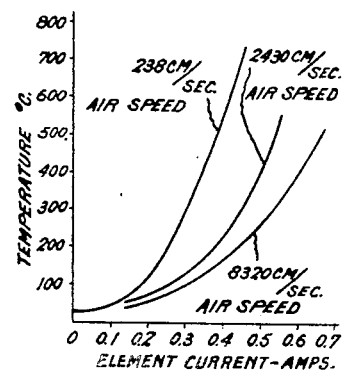
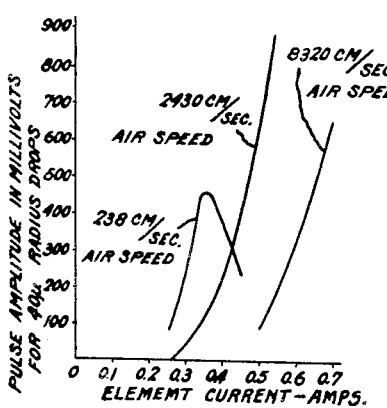 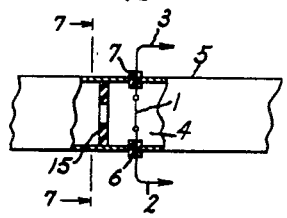 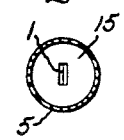
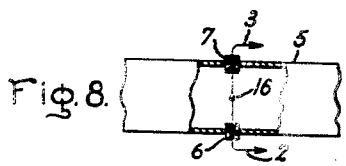
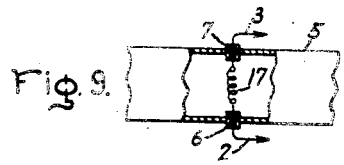 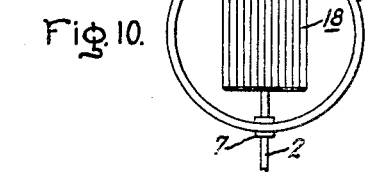
Inventor:
Bernard Vonnegut,
by Paul A. Frank
His Attorney.

Feb. 22, 1955
B. VONNEGUT
2,702,471
MEANS FOR MEASURING INDIVIDUAL AEROSOL PARTICLES
Filed March 27, 1951
2 Sheets-Sheet 2
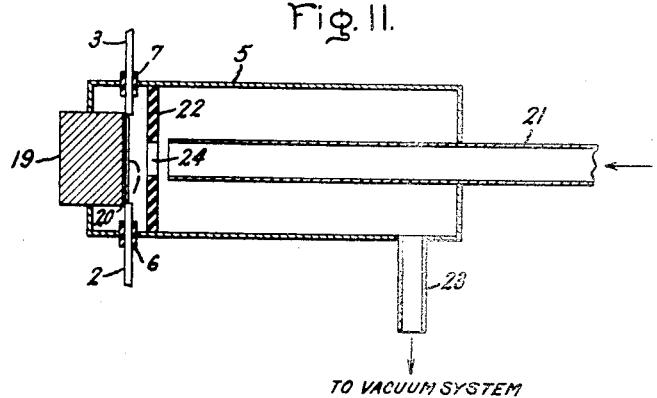
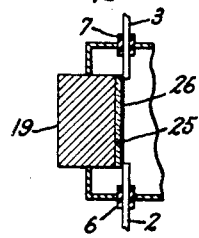 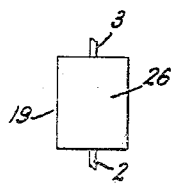
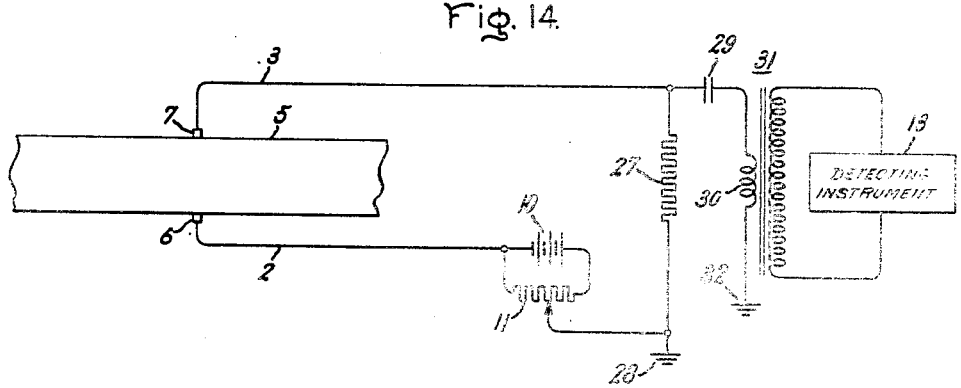
Inventor:
Bernard Vonnegut,
by Paul A. Frank
His Attorney.

//www.patents.com

United States Patent Office 2,702,471
Patented Feb. 22, 1955

2,702,471

MEANS FOR MEASURING INDIVIDUAL AEROSOL PARTICLES

Bernard Vonnegut, Alplaus, N. Y., assignor to General Electric Company, a corporation of New York Application March 27, 1951, Serial No. 217,803

4 Claims. (Cl. 73—28)

This invention relates to means for measuring aerosol particles, particularly to means for making measurements which include the detecting, the counting, and the determining of the size of aerosol particles.

In the study of air pollution and meteorological phenomena, it is of prime importance to have accurate knowledge of the size, concentration and distribution of aerosol particles in aerial disperse systems. For example, the size of individual aerosol particles demands intensive consideration because most of the outstanding properties of aerosol particles, such as inertial deposition, optical obscuration, evaporation or condensation, filtration, insecticidal toxicity, etc., are prominently dependent upon the particle size in disperse phase.

Heretofore, methods and means for measuring aerosol particles having a mean radius of the order of tenths of microns to a few hundred microns have been chiefly concerned with the determination of particle size, concentration, and distribution on the basis of averages. Thus, sedimentation and light scattering techniques normally produce only an average size calculation resulting from the treatment of a sample as containing particles of equal size. Therefore, it is a principal object of the present invention to provide simple and reliable methods and means for detecting counting and determining the size of individual aerosol particles.

One aspect of the invention exemplary of the principles thereof more fully described and defined hereinafter comprises changing the state of the aerosol particles, e. g., vaporizing the particles, by causing them to impinge upon an electrically-energized, conductive, temperature-sensitive element. By selectively detecting the impulsive change in the energy dissipated by the temperature-sensitive element when an individual particle is, for example, vaporized thereupon, the particle concentration, number, and size may be determined.

The features of the invention desired to be protected herein are pointed out with particularity in the appended claims. The invention itself, together with further objects and advantages thereof, may best be understood by reference to the following description taken in accordance with the accompanying drawings, in which Fig. 1 is a partially schematic and partially sectionalized view of apparatus suitably embodying and illustrating the invention; Figs. 2, 3, 4, and 5 are graphs useful in explaining the invention; Fig. 6 is a partially sectionalized view of an alternative embodiment of the invention; Fig. 7 is a view taken along line 7—7 of Fig. 6; Figs. 8 and 9 are partially sectionalized views illustrating alternative forms of temperature-sensitive elements which may be utilized with the apparatus of Fig. 1; Fig. 10 is a side elevation illustrating the temperature-sensitive element in the form of a grid; Fig. 11 is a section view of alternative apparatus suitably embodying and illustrating the invention; Fig. 12 is a fragmentary view of an alternative form of temperature-sensitive element supported in the apparatus of Fig. 11; Fig. 13 is a fragmentary side elevation of the embodiment of Fig. 12; and Fig. 14 illustrates alternative circuitry which may be advantageously employed in the present invention. Wherever practicable, identical reference numerals are used to identify similar elements in the various figures.

Referring now to Fig. 1, there is shown in partially sectionalized, partially schematic form, one embodiment of the device for measuring aerosol particles according to the invention, such embodiment being also useful in illustrating the methods of the invention. As represented, the device comprises a conductive, temperature-sensitive element 1, which is supported by means of conductors 2 and 3 within the bore 4 of a hollow, preferably cylindrical, member 5. Conductors 2 and 3, which are introduced into the bore 4 through insulators 6 and 7 respectively, may be connected in circuit with the primary winding 8 of a transformer 9, a source of direct current conventionally represented by battery 10, and a potentiometer 11. In circuit with the secondary winding 12 of transformer 9 may be connected a suitable detecting instrument 13 which is responsive to voltage impulses generated in secondary winding 12.

Assuming that one end of member 5 is connected by a section of tubing 14 to a suitable vacuum system as indicated, and that the other end of member 5 is exposed to an aerosol containing vaporizable particles having a mean radius from about a few tenths of a micron to several hundred microns, then the aerosol laden with vaporizable particles will be drawn through the bore 4 of member 5. When a vaporizable aerosol particle collides with or impinges upon temperature-sensitive, conductive element 1, which is heated to a temperature above the vaporization temperature of the particle by the passage therethrough of current from direct current source 10, the heat necessary to raise the temperature of the particle and to vaporize it momentarily reduces the temperature of a portion of temperature sensitive element 1 and thereby momentarily reduces its electrical resistance. This sudden cooling produces a brief increase in the current flowing through the circuit, including conductors 2 and 3, and this increase in current appears as a voltage pulse across the secondary winding 12 of transformer 9. Detecting instrument 13 transforms this voltage pulse into a desired visible indication.

The curves in Fig. 2 show how the steady state temperature and current in the device of Fig. 1 are altered by the vaporization of the aerosol particle and the voltage pulse which is produced in the secondary winding 12 of transformer 9. As will be observed, the current in the circuit including conductors 2, 3, and element 1 increases when the temperature of element 1 decreases. Since the voltage across secondary winding 12 is proportional to the time rate of change of the current through primary winding 8 and element 1, the positive increase in voltage is followed by a decrease to zero and a negative peak.

Results obtained with the device of Fig. 1 indicate conclusively that the magnitude of the voltage pulse appearing across secondary winding 12 is dependent upon the size of the aerosol particles which are individually vaporized upon temperature-sensitive element 1. For example, if conductive, temperature-sensitive element 1 comprises a nickel, tungsten, or platinum wire about 0.001" in diameter and about 0.25" long, and if an aerosol laden with water droplets produced by blowing one's breath into a refrigerated container is drawn through the bore 4 of member 5, many small pulses are detected by instrument 13, which may be an oscilloscope or a pulse-responsive recording instrument, etc. If the cloud droplets produced in the refrigerated container are then increased in size by blowing in more moisture, the voltage pulses increase in magnitude. Moreover, when the supercooled cloud is partially converted to ice crystals by "seeding" with ice-forming nuclei, such as comminuted Dry Ice, the resultant ice crystals produce much larger voltage pulses because of their greater size, and these pulses grow rapidly as the ice crystals increase in size. Methods of "seeding" to produce ice crystals are described by Vincent J. Schaefer in an article entitled "The production of ice crystals in a cloud of supercooled water droplets," Science, 104, pages 457–459 (1946).

The calibration of the device of Fig. 1 for particle size necessarily involves the consideration of a number of variables. The principal variables involved are as follows: the diameter or width of element 1, the length of element 1, the velocity with which the aerosol laden with particles is drawn past the element 1, the heating current through element 1, the temperature of element 1, the composition of element 1, aerosol particle size, and aerosol particle composition. One suitable method of calibrating the device of Fig. 1 with respect to water droplets comprises filling a balloon with saturated air containing a known concentration of condensation nuclei. This air is then introduced into a flask and expanded from some pressure above atmospheric pressure to atmospheric pressure, whereby a certain concentration of water droplets is formed as a cloud. Since the concentration of condensation nuclei, and hence cloud droplets, remains constant, it is possible to calculate from temperature lowering produced by the expansion how the mass of cloud droplets varies with the expansion. Then, if this cloud is drawn through the core 4 of member 5 at a constant velocity with constant heating current for element 1, the average amplitude of the pulses appearing across secondary winding 12 may be plotted against the computed mass of the droplets expressed in arbitrary units. Such a curve is shown in Fig. 3, wherefrom it may be observed that the amplitude of the voltage pulse occurring across winding 12 varies linearly with respect to the mass of the droplets.

It is of particular importance, in connection with the utilization of the device of Fig. 1, to avoid turbulence in the aerosol as it is drawn through the bore 4. Turbulence produces an undesirable background noise which results in spurious voltage pulses occurring across the secondary winding 12 of transformer 9. For this reason, it is preferred to draw an aerosol through the bore 4 by means of a vacuum system connected to one end of member 5, as has been described heretofore. If, however, it is desired to measure particles in an aerosol having a rapidly varying velocity, e. g., wind, the portion of member 5 preceding the position of element 1 may be made of considerable length whereby the turbulence will be decreased to eliminate the deleterious effect of background noise.

As has been mentioned heretofore, the temperature of element 1, the velocity of the aerosol past the wire, and the heating current through element 1, all effect the response of the device of Fig. 1. In Fig. 4, the temperature in degrees centigrade of element 1 is plotted against the current therethrough in amperes for three different aerosol velocities, as indicated. Fig. 5 illustrates the variation in the amplitude of the voltage pulses appearing across winding 12 with respect to the current through element 1 for the same aerosol velocities as in Fig. 4. In each instance, element 1 consists of a platinum wire 0.001" in diameter and 0.25" long. Water droplets having a radius of 40 microns were employed to obtain the data for Fig. 5. It will be observed from the curve in Fig. 5 taken at an aerosol velocity of 238 cm. per second that the pulse amplitude decreases with increasing current through element 1. This apparently occurs because the temperature of element 1 becomes too high with respect to aerosol velocity, thereby causing the water droplets to bounce off element 1 on a layer of steam before they are vaporized.

From Figs. 4 and 5 it may be seen that the amplitude of the pulses appearing across secondary winding 12 for a given size particle varies with the temperature of element 1. Since element 1 may be expected to have a lower temperature at its ends, where it is supported, than at its center, the response of the device of Fig. 1 will vary somewhat according to where the drop impinges upon element 1. To minimize this effect, a washer 15 may be inserted into bore 4 just preceding element 1, as is illustrated in Figs. 6 and 7. A constriction (not shown) in the wall of member 5 in a similar position serves to fulfill a like advantageous purpose.

It has been found that the above described methods and apparatus may also be employed to detect, count and determine the size of oxidizable aerosol particles, such as particles of oils, glycerine, etc., providing the temperature of conductive, temperature-sensitive element 1 is maintained sufficiently high to cause combustion of the particles. In such event, the oxidizable or combustible particles are ignited when they strike element 1, and the resultant combustion further heats element 1, thereby producing a voltage pulse across secondary winding 12 of opposite polarity to that obtained from the vaporization of a particle.

Non-vaporizable particles may be measured according to the invention if they are soluble in some solvent. For example, an aerosol laden with salt crystals may be converted into an aerosol laden with liquid solution particles by passing it over a volatile liquid in which the salt particles are soluble. The vapor of this liquid then condenses upon the salt particles and dissolves them, thereby producing liquid particles to which the device of Fig. 1 will respond as above described in connection with vaporizable particles.

It is not essential to the present invention that the conductive, temperature-sensitive element be in the form of a thin wire. For example, the element may consist of a thermistor bead 16, as illustrated in Fig. 8, or a helical filament 17 of suitable diameter, as represented in Fig. 9. Alternatively, the element may consist of a parallel wire grid 18, as shown in Fig. 10, or it may consist of a wire mesh grid (not shown). Temperature-sensitive elements in the form of grids are particularly advantageous in connection with the measurement of low concentrations of aerosol particles.

In Fig. 11 there is illustrated an alternative embodiment of the invention wherein the temperature-sensitive element is disposed in such a manner as to reduce the effect of turbulence and to reduce the possibility of the aerosol particles striking the element at various portions thereof having different temperatures. As shown, member 5 is closed at one end by means of a relatively large conductive member 19. Affixed to the inner surface of member 19 is a thin sheet of insulating material 20 which, in turn, bears along a portion of its inner surface against conductors 2 and 3. Through the closed other end of member 5 is inserted a hollow cylindrical member 21, the inner end of which terminates near a washer 22. As air is withdrawn from the interior of member 5 through a suitable connection 23 to a vacuum system, aerosol laden with particles may be drawn into member 5 through member 21. Since the particles have a greater mass than the accompanying air or gas molecules, they will continue in the direction of their travel through the aperture 24 in washer 22 and impinge upon temperature-sensitive conductive element 1. In this manner, most of the turbulence created by the influx of air or gas molecules will be confined to the interior portion of member 5 lying to the right side of washer 22. Moreover, conductive member 19, because of its relatively large mass, tends to reduce the temperature gradient along the length of temperature-sensitive element 1.

In Figs. 12 and 13, there is illustrated alternative structure for the temperature sensitive element of Fig. 11. In this embodiment, the temperature-sensitive element consists of a thin section 25 of glass having a layer 26 of conductive material deposited on the surface thereof in a manner well known to those skilled in the art.

In Fig. 14, there is shown alternative circuitry which may be employed in connection with the invention. Conductors 2 and 3 are connected in circuit with a resistor 27, one side of which may be connected to ground, as indicated at 28. The other side of resistor 27 is connected through a capacitor 29 to one end of the primary winding 30 of the transformer 31, the other end of secondary winding 30 being connected to ground at 32. The detecting instrument 13 is connected across the secondary winding 33 of transformer 31 in a manner similar to its connection to the secondary winding 12 of transformer 9 in Fig. 1. As will readily be understood by those skilled in the art, current impulses in the circuit including conductors 2 and 3 produce an impulsive voltage across resistor 27 which is transmitted through capacitor 29 and transformer 31 to detecting instrument 13. If desired, transformer 31 may be replaced by a resistor which will serve as the grid leak resistor for the input stage of a resistance-coupled amplifier (not shown). In such event, detecting instrument 13 may then be connected to the output terminals of the amplifier.

It will be readily appreciated from the foregoing description that aerosol particles may be counted according to the invention without reference to their size. If only counting is desired, the relative magnitudes of the voltage pulses, produced by aerosol particles striking element 1, are not of primary importance; and suitable scaling and counting circuits well known to those skilled in the art may be employed to provide the desired information regarding particle numbers.

Among the many advantages of the invention, some of which have been mentioned heretofore, are those which result from the utilization of a relatively low impedance circuit to produce voltage pulses dependent upon aerosol particle size and number. Thus, conductive, temperature-sensitive element 1 may be energized by a conveniently low voltage source, such as battery 10, and, consequently, the operation of element 1 is not materially affected by humidity changes and electrical leakage.

While my invention has been described by reference to particular embodiments and examples thereof, alternative constructions and methods will readily occur to those skilled in the art. I, therefore, aim in the appended claims to cover all such equivalent embodiments as may be within the true spirit and scope of the foregoing description.

What I claim as new and desire to secure by Letters Patent of the United States is:

1. A device for measuring individual vaporizable aerosol particles comprising a hollow cylindrical member, a conductive temperature-sensitive element insulatingly supported transversely of the bore of said member to be maintained at a temperature at least as high as the vaporization temperature of said aerosol particles, means for directing aerosol particles through the bore of said member and over said element, a source of direct current connected in circuit with said element to heat the same, and current pulse responsive means in circuit with said element for detecting the change in current through said element occasioned by the vaporization thereupon of individual aerosol particles.

2. A device for measuring individual combustible aerosol particles comprising a hollow cylindrical member, a conductive temperature-sensitive element insulatingly supported transversely of the bore of said member to be maintained at a temperature at least as high as the vaporization temperature of said aerosol particles, means for directing aerosol particles through the bore of said member and over said element, a source of direct current connected in circuit with said element to heat the same, and current pulse responsive means in circuit with said element for detecting the change in current through said element occasioned by the combustion thereupon of individual aerosol particles.

3. A device for measuring individual vaporizable aerosol particles comprising a hollow member, a conductive temperature sensitive element insulatingly supported transversely of the bore of said hollow member to be maintained at a temperature at least as high as the vaporization temperature of said aerosol particles, means for directing aerosol particles through the bore of said member and over said element, a source of direct current connected in circuit with said element to heat the same, and current pulse responsive means in circuit with said element for detecting the change in current through said element occasioned by the vaporization thereupon of individual aerosol particles.

4. A device for measuring individual vaporizable aerosol particles comprising a conductive temperature sensitive element to be maintained at a temperature at least as high as the vaporization temperature of said aerosol particles, a support for mounting said element in the path of projection of the particles to be tested, a source of direct current electric energy connected in circuit relationship with said element to heat the same, and current pulse responsive means in circuit relationship with said element for detecting the change in current through said element occasioned by the vaporization thereupon of individual aerosol particles.

References Cited in the file of this patent

UNITED STATES PATENTS

| 2,501,377 | Cherry | Mar. 21, 1950 |
| 2,552,017 | Schwartz et al. | May 8, 1951 |

FOREIGN PATENTS

| 924,726 | France | Aug. 13, 1947 |